US010664265B2

(12) United States Patent
Viana et al.

(10) Patent No.: US 10,664,265 B2
(45) Date of Patent: May 26, 2020

(54) GENERATING TARGET CONFIGURATION CONTAINERS PROVIDING COMPUTER ENVIRONMENTS BASED ON A CONFIGURATION CONTAINER

(71) Applicant: International Business Machines Corporation, Armonk, NY (US)

(72) Inventors: Phillip L. Viana, Austin, TX (US); Lan Luo, Beijing (CN); Fang Wang, Plano, TX (US); Vanessa Michelini, Boca Raton, FL (US); Yan Du, Beijing (CN); Li Long Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/117,109

(22) Filed: Aug. 30, 2018

(65) Prior Publication Data
US 2020/0073649 A1 Mar. 5, 2020

(51) Int. Cl.
*G06F 8/65* (2018.01)
*G06F 8/61* (2018.01)
*G06F 9/445* (2018.01)

(52) U.S. Cl.
CPC .................. *G06F 8/65* (2013.01); *G06F 8/63* (2013.01); *G06F 9/44505* (2013.01)

(58) Field of Classification Search
CPC ..................................... G06F 8/65; G06F 8/63
USPC .......................................................... 717/169
See application file for complete search history.

(56) References Cited

U.S. PATENT DOCUMENTS

| 7,673,028 | B2 | 3/2010 | Baikov et al. | |
|---|---|---|---|---|
| 8,707,298 | B2 | 4/2014 | Araki | |
| 9,276,816 | B1 | 3/2016 | Conte et al. | |
| 9,348,622 | B2 | 5/2016 | Emelyanov et al. | |
| 9,658,846 | B2 | 5/2017 | Kramer et al. | |
| 9,858,157 | B2 | 1/2018 | Chavda et al. | |
| 2010/0037207 | A1* | 2/2010 | Chambers, Jr. ........... | G06F 8/63 717/121 |
| 2012/0081395 | A1* | 4/2012 | Adi ........................... | G06F 8/63 345/634 |

(Continued)

OTHER PUBLICATIONS

Javed, Container-Based IoT Sensor Node on Raspberry Pi and the Kubernetes Cluster Framework, Aalto University School of Science, Jul. 25, 2016, pp. 1-67.

(Continued)

*Primary Examiner* — Qing Chen
*Assistant Examiner* — Clint Thatcher
(74) *Attorney, Agent, or Firm* — Robert Bunker; Edell, Shapiro & Finnan, LLC

(57) ABSTRACT

A method, system, and computer program product are provided for generating a container providing a computing environment. At least one processing device combines a base image of a first type of container, including at least one application and an operating system, with a base image of a second type of container including middleware and configuration information to produce a base image of a target container including, from the first type of container, the at least one application and the operating system, and the middleware and the configuration information from the second type of container. The base image of the target container is executed on a computer to provide the computing environment configured in accordance with the configuration information.

20 Claims, 7 Drawing Sheets

(56) References Cited

U.S. PATENT DOCUMENTS

| | | | |
|---|---|---|---|
| 2012/0084769 A1* | 4/2012 | Adi | G06F 8/63 |
| | | | 717/174 |
| 2017/0116321 A1 | 4/2017 | Jain et al. | |
| 2017/0249127 A1* | 8/2017 | Parees | G06F 8/30 |
| 2017/0255462 A1* | 9/2017 | Azagury | G06F 8/76 |
| 2017/0359223 A1 | 12/2017 | Hsu | |
| 2018/0048545 A1 | 2/2018 | Mishalov et al. | |
| 2018/0075041 A1 | 3/2018 | Susairaj et al. | |
| 2018/0075044 A1 | 3/2018 | Kruglikov et al. | |
| 2018/0088993 A1 | 3/2018 | Gerdesmeier et al. | |
| 2018/0129479 A1* | 5/2018 | McPherson | G06F 11/3668 |
| 2018/0189089 A1* | 7/2018 | Chen | G06F 9/45558 |
| 2018/0341471 A1* | 11/2018 | Stefanov | G06F 9/455 |

OTHER PUBLICATIONS

Leicher et al., Integrating Container Services With Pluggable System Extensions, Lecture notes in computer science, 2003, pp. 1-18.
Dawadi et al., CoMMoN: The Real-Time Container and Migration Monitoring as a Service in the Cloud, Journal of the Institute of Engineering, 2016, 12(1): pp. 51-62.
Tarasov et al., In Search of the Ideal Storage Configuration for Docker Containers, Foundations and Applications of Self Systems, 2017 IEEE 2nd International Workshop on, pp. 199-206.

* cited by examiner

GENERATING TARGET CONFIGURATION CONTAINERS PROVIDING COMPUTER ENVIRONMENTS BASED ON A CONFIGURATION CONTAINER

BACKGROUND

1. Technical Field

Present invention embodiments relate to a configuration container having configuration information for use with a source container including one or more applications and an operating system, to produce a target container providing a computing environment. In particular, present invention embodiments relate to a method, a system and a computer program product for combining a base image of a configuration container, including configuration information and middleware, with a base image of a source container including one or more applications and an operating system to produce a base image for a target container providing a computing environment including the one or more applications, the middleware, the operating system and the configuration information.

2. Discussion of the Related Art

Within the last few years, container-based virtualization has been largely adapted. For example, well-known companies such as Google, Netflix, Spotify, as well as others, are using container-based virtualization.

Container technology is being utilized more and more in production environments. A container provides a computing environment and may be configured manually or via an automated script. However, configuring a large number of containers is time-consuming and is difficult to maintain. In addition, due to environment-related configurations and existing micro-service infrastructure environments being incompatible with various middleware/application servers, configuring a large number of containers may be error-prone and inefficient. As a result, existing methods of configuring containers are not suitable for large and scalable environments.

SUMMARY

According to one embodiment of the present invention, a computer-implemented method is provided for generating a container providing a computing environment. At least one processing device combines a base image of a first type of container including at least one application an operating system with a base image of a second type of container including middleware and configuration information to produce a base image of a target container including the at least one application and the operating system from the source container and the middleware and the configuration information from the configuration container. The base image of the target container is executed on a computer to provide a computing environment configured in accordance with the configuration information.

According to a second embodiment of the present invention, a computer system is provided for generating a container providing a computing environment. The computer system includes at least one processor and at least one memory connected to the at least one processor. The at least one memory has instructions stored therein such that when the at least one processor executes the instructions, the at least one processor performs a method. According to the method, a base image of a first type of container including at least one application and an operating system is combined with a base image of a second type of container including middleware and configuration information to produce a base image of a target container including, from the first type of container, the at least one application and the operating system, and the middleware and the configuration information from the second type of container. The base image of the target container is executed to provide a computing environment configured in accordance with the configuration information.

According to a third embodiment of the present invention, a computer program product is provided for generating a container providing a computing environment. The computer program product includes at least one computer readable storage medium having computer readable program code embodied therewith for execution on at least one processor of a computer device. The computer readable program code is configured to be executed by the at least one processor to perform multiple steps. According to the multiple steps, a base image of a first type of container including at least one application and an operating system is combined with a base image of a second type of container including middleware and configuration information to produce a base image of a target container including, from the first type of container, the at least one application and the operating system, and the middleware and the configuration information from the second type of container. The base image of the target container is executed to provide a computing environment configured in accordance with the configuration information.

BRIEF DESCRIPTION OF THE DRAWINGS

Generally, like reference numerals in the various figures are utilized to designate like components.

DETAILED DESCRIPTION

In embodiments of the invention, a configuration container is used to produce a target container with a computing environment. The configuration container may include configuration information and middleware for use with a source container, which may include one or more applications and an operating system.

One existing tool for creating containers is Docker, which is available from Docker, Inc., a Delaware Corporation. Docker is an open-source project based on Linux containers. A Dockerfile is a text, or script, file, which includes commands for Docker to build a base image of a container. The base image of a container is a read-only template that is essentially a snapshot of the container. When an image is started, it produces the container.

In embodiments of the invention, a configuration file (or Configfile) is a text, or script, file, which includes commands for a tool of present invention embodiments to create a base image of a configuration container. The tool may be a plugin for Docker or a may be a separate application.

In various embodiments, a base image of a configuration container may be injected into, or combined with, a base image of a source container to produce a base image of a target container. The base image for the source container may include one or more applications and an operating system. The base image for the configuration container may include middleware and configuration information. A base image of the produced target container includes the one or more applications, the middleware, the operating system and the configuration information.

Figure 1:
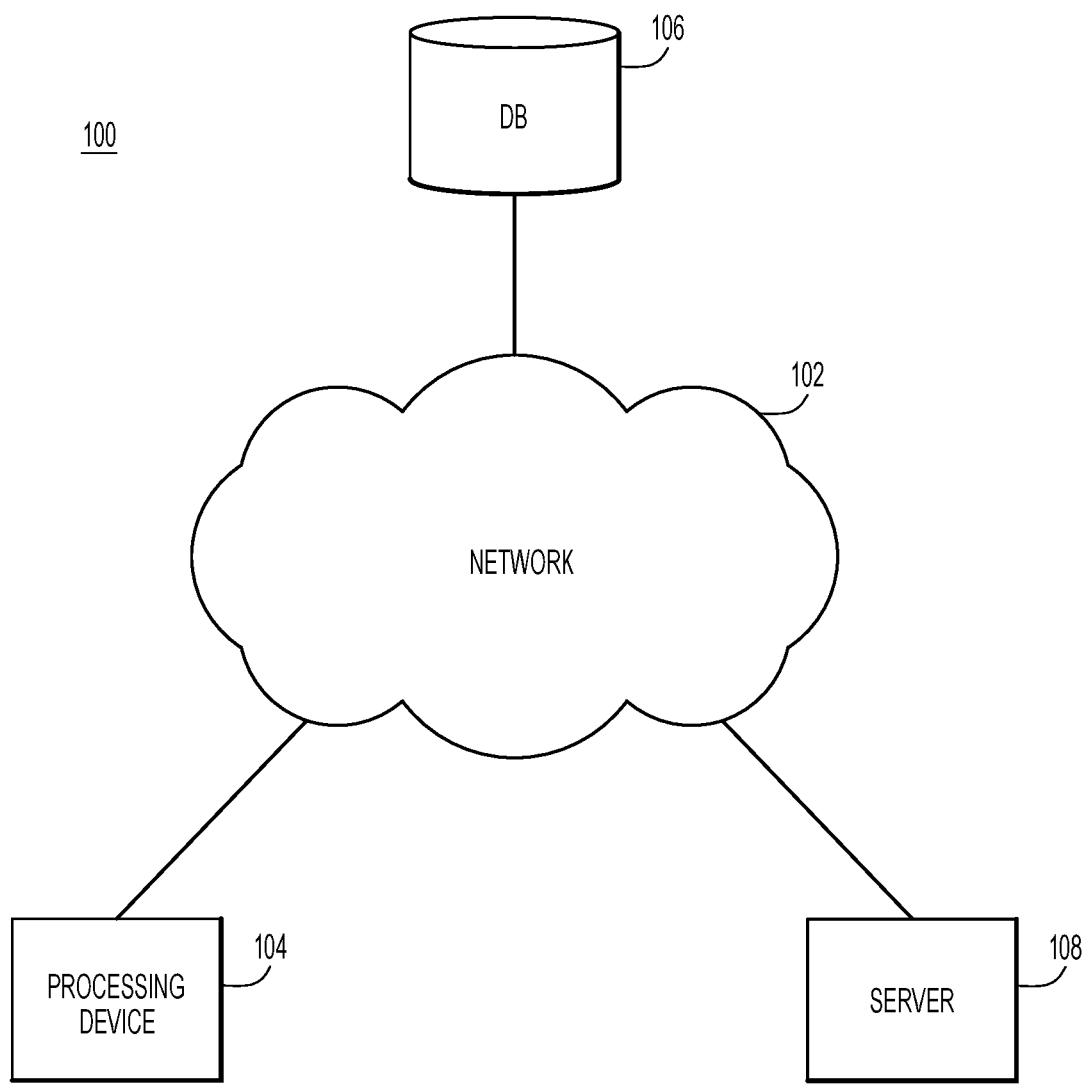
FIG. 1 shows an example operating environment according to embodiments of the invention.

An example environment 100 for use with present invention embodiments is illustrated in FIG. 1. Specifically, environment 100 may include a processing device 104, a network 102, a database 106 and a server 108. Processing device 104 and database 106 may be remote from each other and communicate over network 102. Network 102 may be implemented by any number of any suitable communications media (e.g., wide area network (WAN), local area network (LAN), Internet, Intranet, etc.). Alternatively, processing device 104 and database 106 may be local to each other, and communicate via any appropriate local communication medium (e.g., local area network (LAN), hardwire, wireless link, Intranet, etc.). In some embodiments, database 106 may be directly connected to processing device 104 or may be included on one or more storage devices of processing device 104.

Server 108 may be a single processing device or a server farm including multiple processing devices.

Processing device 104 may generate a base image of a configuration container that may be combined with a base image of a source container including at least one application and an operating system to produce a base image of a target container including the at least one application, middleware, the operating system, and configuration information from the base image of the configuration container. The base image of the target container may be executable on processing device 104 or on one or more other processing devices such as, for example, server 108. Server 108 may include a Tomcat server, a Websphere® server, or another type of server. Websphere is a registered trademark of International Business Machines Corporation, a New York corporation.

In an alternative environment, processing device 104 may also be server 108.

Figure 2:
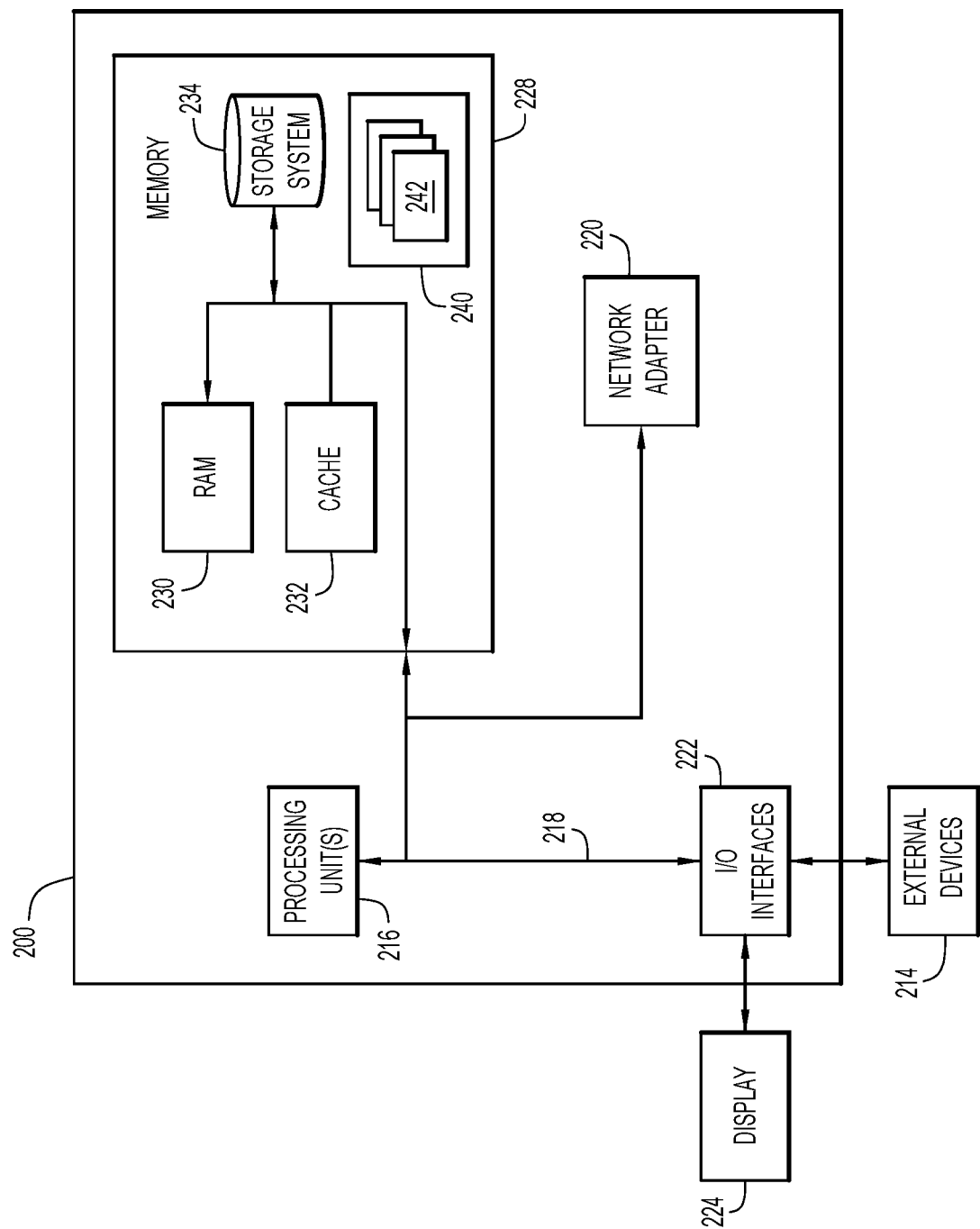
FIG. 2 is a block diagram of a computer system for implementing a processing device according to embodiments of the invention.

Referring now to FIG. 2, a schematic of an example computer system 200 is shown, which may implement processing device 104 and server 108 in various embodiments. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: a microphone, one or more speakers, microcode, device drivers, redundant processing units, external disk drive arrays, RAID systems, tape drives, and data archival storage systems, etc.

Figure 3:
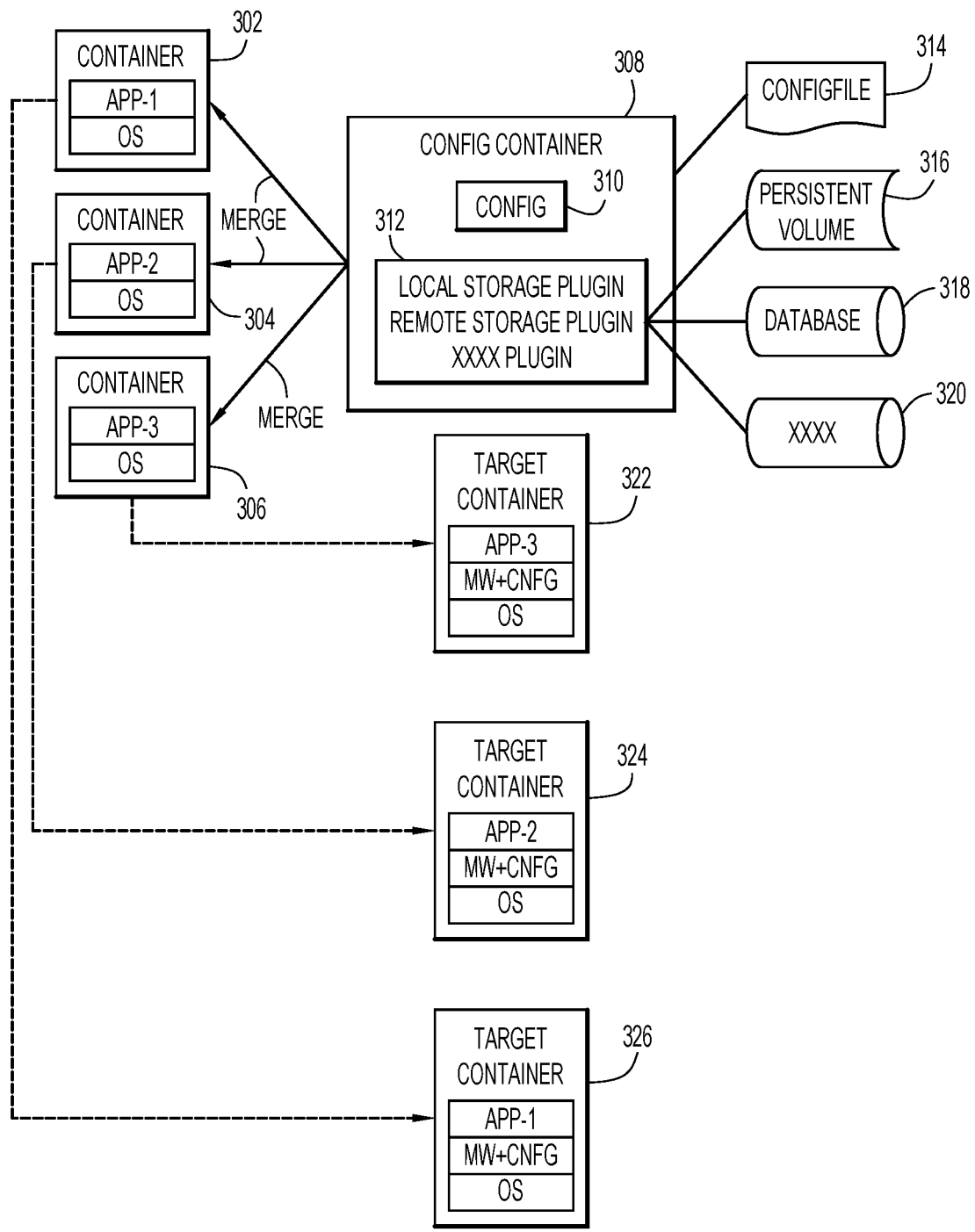
FIG. 3 is a block diagram that explains operation of embodiments of the invention.

FIG. 3 illustrates an example operation of some embodiments of the invention. Base images of source containers 302, 304, 306, respectively, may include: application 1 and an operating system; application 2 and an operating system; and application 3 and an operating system. In this specification, the term "source container" is used to refer to a container that includes one or more applications and an operating system. Middleware and application specific configuration information such as, for example, data source related information, shared files, domain name server (DNS) information, etc. may have been extracted from the container. A base image for a configuration container 308 may be created by processing device 104 or server 108 based on a Configfile 314. The base image for configuration container 308 may include configuration information 310 and plugins 312. Configuration information 310 may include, but not be limited to, environment specific information, data source related information, and DNS information. The middleware and application specific information that may have been extracted from the source container may be included in configuration container 308. Plugins 312 may include a local storage plugin, a remote storage plugin and any other plugin. The local storage plugin may use persistent volume 316 for local storage. The remote storage plugin may use database 318 for remote storage. Other plugin 320 may include one or more plugins that include a process or a serverless function that cooperates with a Docker engine/application program interface (API) to provide extra services for handling configurations such as, for example, service routing, environment settings to be included, a storage volume mounting service, etc.

Processing device 104 or server 108 may inject, or combine, the base image of configuration container 308 with, each of the base images of source containers 302, 304, 306, respectively, to produce respective base images of a target containers 326, 324, 322. For example, combining the base image of the configuration container 308 with the base image of source container 302 produces target image 326, which includes the application 1 and the operating system from the base image of source container 302 and the middleware and configuration information 310 from the base image of configuration container 308. Combining the base image of source container 304 with the base image of configuration container 308 produces the base image of target container 324, which includes the application 2 and the operating system from the base image of container 304 and the middleware and configuration information 310 from the base image of configuration container 308. Combining the base image of source container 306 with the base image of configuration container 308 produces the base image of target container 322, which includes the application 3 and the operating system from the base image of container 306 and the middleware and configuration information 310 from the base image of configuration container 308. Thus, a base image of a single configuration container may be combined with each of a number of base images of source containers to produce respective base images of target containers, which are executed on a processing device such as, for example, processing device 104 or server 108. As a result, a process of changing a configuration for a number of source containers becomes a scalable process.

Although the above example shows each source container having a single application, in embodiments of the invention each source container may include multiple applications.

Figure 4:
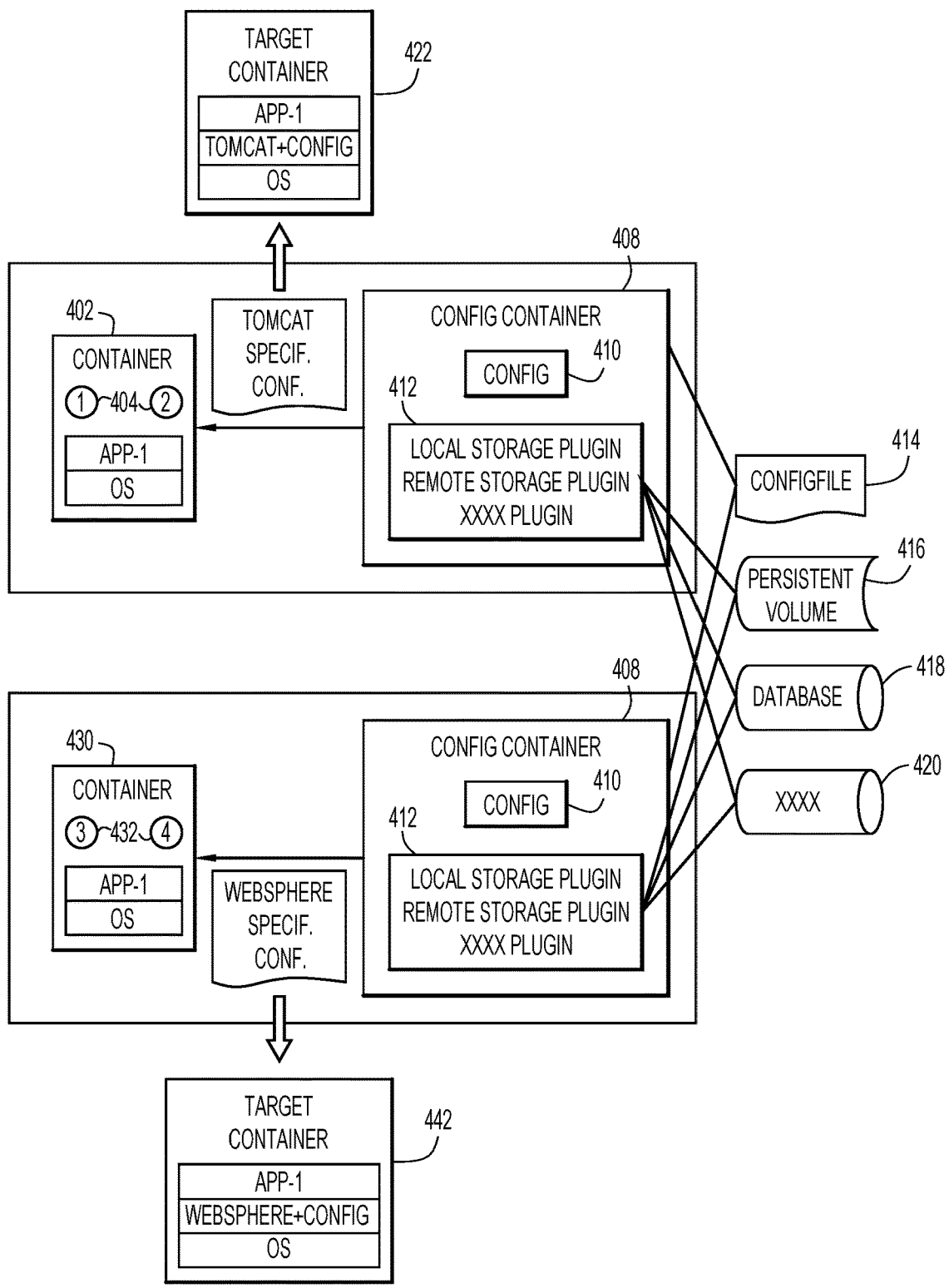
FIG. 4 is a block diagram that explains operation of other embodiments of the invention.

FIG. 4 illustrates example operation of another embodiment of the invention. In this embodiment, base images of source containers 402, 430 may have been generated by processing device 104 or server 108 and, respectively, include tags 404 and tags 432. The base image of source container 402 includes: application 1 and an operating system. Tags 404 have a value of 1, indicating that a base image for a target container is to be built for a Tomcat server with Tomcat environment variables, and a value of 2, indicating that the base image of the target container is to be built for a production environment.

A base image for a configuration container 408 may be created by processing device 104 or server 108 based on a Configfile 414. The base image for configuration container 408 may include middleware and configuration information 410 and plugins 412. Configuration information 410 may include, but not be limited to, environment specific information, data source related information, and DNS information. Middleware and application specific information may have been extracted from container 402 and included in configuration container 408. Plugins 412 may include a local storage plugin, a remote storage plugin and any other plugin. The local storage plugin may use persistent volume 416 for local storage. The remote storage plugin may use database 418 for remote storage. Other plugin 420 may include one or more plugins that include a process or a serverless function that cooperates with a Docker engine/application program interface (API) to provide extra services for handling configurations such as, for example, service routing, environment settings to be included, a storage volume mounting service, etc.

The base image of configuration container 408 may be combined with the base image of source container 402 to produce a base image of a target container 422 that includes application 1, middleware for a specific environment (for example, a Tomcat server) and the operating system. Due to the presence of a tag with a value of 2, from source container 402, the produced base image of target container 422 is configured for a production environment. The Docker engine is able to distinguish different environments based on tags, such as the tag with the value of 2. The base image of the target container 422 may be executed by processing device 104 or server 108.

A base image of source container 430 includes: application 1 and an operating system. Tags 432 have a value of 3, indicating that a base image for a target container is to be built for a specific environment including, for example, application and integration middleware with corresponding environment variables, and a value of 4, indicating that the base image of the target container is to be built for a development environment. The Docker engine is able to distinguish different environments based on tags, such as the tag with the value of 4.

The base image for configuration container 408 may be reused and combined with the base image of source container 430 to produce a base image of a target container 442 that includes application 1, application and integration middleware for another specific environment (for example, Websphere®) with the corresponding environment variables and the operating system as indicated by the tag with a value of 3 in the base image for source container 430. Due to the presence of the tag with a value of 3, from the base image of source container 430, the produced base image of target container 442 is configured for a production environment. The Docker engine is able to distinguish different environments based on tags, such as the tag with the value of 3. The base image of the target container 442 may be executed by processing device 104 or server 108.

The example shown in FIG. 4 shows how a same base image of a configuration container may be combined with two different base images of source containers to produce two different base images of target containers configured for different specific environments. The values of tags in other embodiments may indicate environments other than those discussed in the above example.

Figure 5:
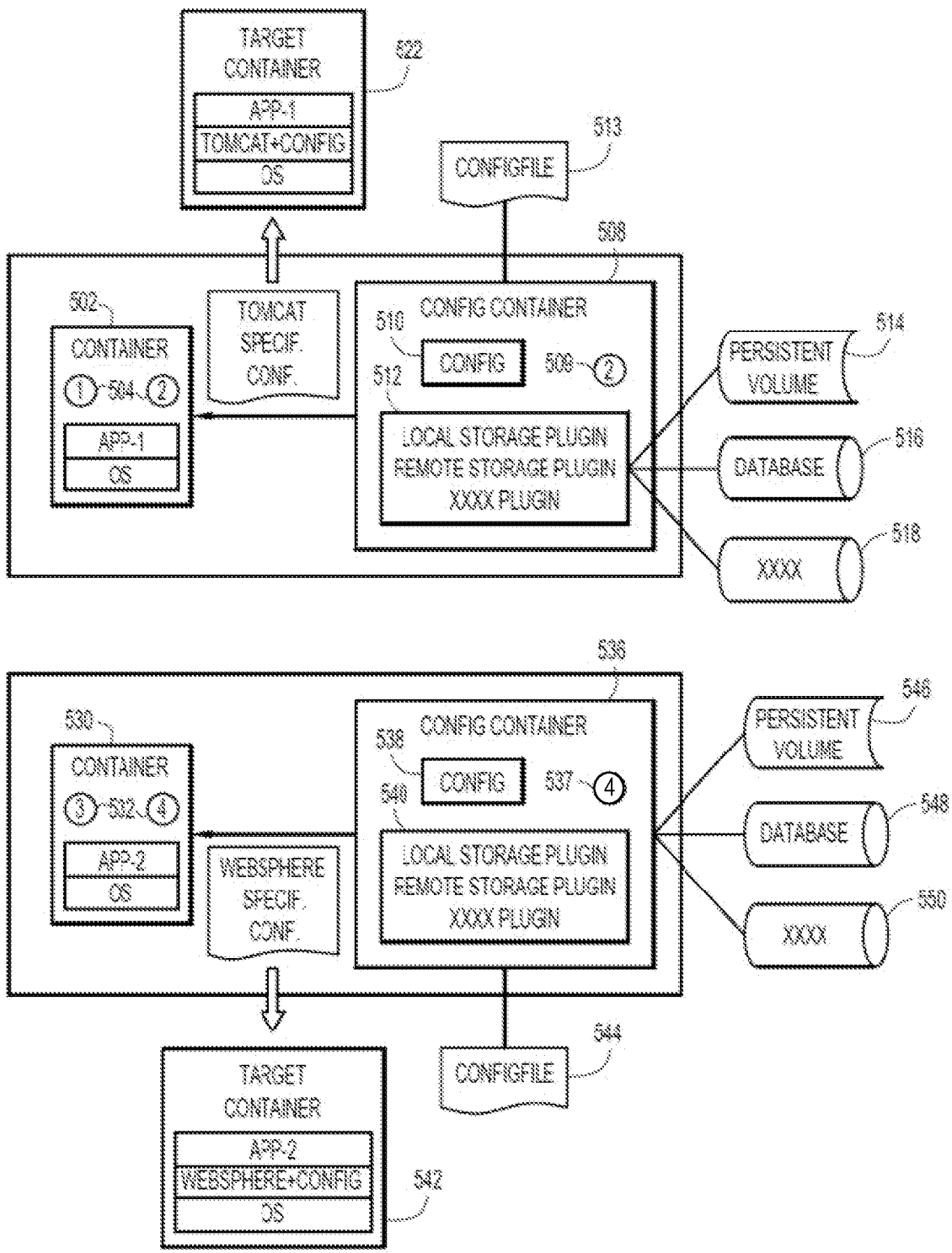
FIG. 5 is a block diagram that explains operation of yet other embodiments of the invention.

FIG. 5 illustrates example operation of yet another embodiment of the invention. Processing device 104 or server 108 may generate base images or source containers 502, 530 and a base image of configuration containers 508, 536. The base image of source container 502 includes: application 1 an operating system. Tags 504 have a value of 1, indicating that a base image for a target container is to be built for a Tomcat server with Tomcat environment variables, and a value of 2, indicating that the base image of the target container is to be built for a production environment. The Docker engine is able to distinguish different environments based on tags, such as the tag with the value of 2.

The base image for a configuration container 508 may be created based on a Configfile 513. The base image for configuration container 508 may include configuration information 510 and plugins 512. Configuration information 510 may include, but not be limited to, environment specific information, data source related information, and DNS information. Middleware and application specific information may have been extracted from container 502 and included in configuration container 508. Plugins 512 may include a local storage plugin, a remote storage plugin and any other plugin. The local storage plugin may use persistent volume 514 for local storage. The remote storage plugin may use database 516 for remote storage. Other plugin 518 may include one or more plugins that include a process or a serverless function that cooperates with a Docker engine/application program interface (API) to provide extra services for handling configurations such as, for example, service routing, environment settings to be included, a storage volume mounting service, etc. Tag 509 of the base image of configuration container 508 has a value of 2 indicating, in this example, that the base image of configuration container 508 is for a production environment.

Processing device 104 or server 108 may combine the base image of configuration container 508 with the base image of source container 502 to produce a base image of a target container 522 that includes application 1, middleware for a specific environment (for example, the Tomcat server as indicated by the tag with the value of 1), and the operating system. The base image of target container 522 may be executed by processing device 104 or server 108.

A base image of source container 530 includes: application 2 and an operating system. Tags 532 have a value of 3, indicating that a base image for a target container is to be built for integration and application middleware with corresponding environment variables, and a value of 4, indicating that the base image of the target container is to be built for a development environment. The Docker engine is able to distinguish different environments based on tags, such as the tag with the value of 2.

A base image for a configuration container 536 may be created based on a Configfile 544. The base image for configuration container 536 may include configuration information 538 and plugins 540. Configuration information 538 may include, but not be limited to, environment specific information, data source related information, and DNS information. Middleware and application specific information may have been extracted from container 502 and included in configuration container 536. Plugins 540 may include a local storage plugin, a remote storage plugin and any other plugin. The local storage plugin may use persistent volume 546 for local storage. The remote storage plugin may use database 548 for remote storage. Other plugin 550 may include one or more plugins that include a process or a serverless function that cooperates with a Docker engine/application program interface (API) to provide extra services for handling configurations such as, for example, service routing, environment settings to be included, a storage volume mounting service, etc. In this example, tag 537 has a value of 4 indicating that the base image of configuration container 536 is for a development environment. The Docker engine is able to distinguish different environments based on tags, such as the tag with the value of 4.

The presence of the tag with a value of 3 in the base image of source container 530, indicates an integration and application specific environment information such as, for example, Websphere® information, may be accessed. The base image of configuration container 536 may be combined with the base image of source container 530 to produce a base image of a target container 542 that includes application 2, integration and application middleware for the specific environment (for example, Websphere®) and the operating system from the base image of source container 530.

Although, FIGS. 4 and 5 show base images for configuration containers being created shortly before being combined with a base image for a respective source container, the base images of the configuration containers, the respective base images of the source containers, or both the base images of the source containers and the base images of the respective source containers may have been created at an earlier time and stored in a repository for later use.

Further, FIGS. 4 and 5 show the base image of each source container including only one application. However, the base image of each source container may include multiple applications.

The values of tags in other embodiments may indicate environments other than those discussed in the above example of FIG. 5.

Figure 6:
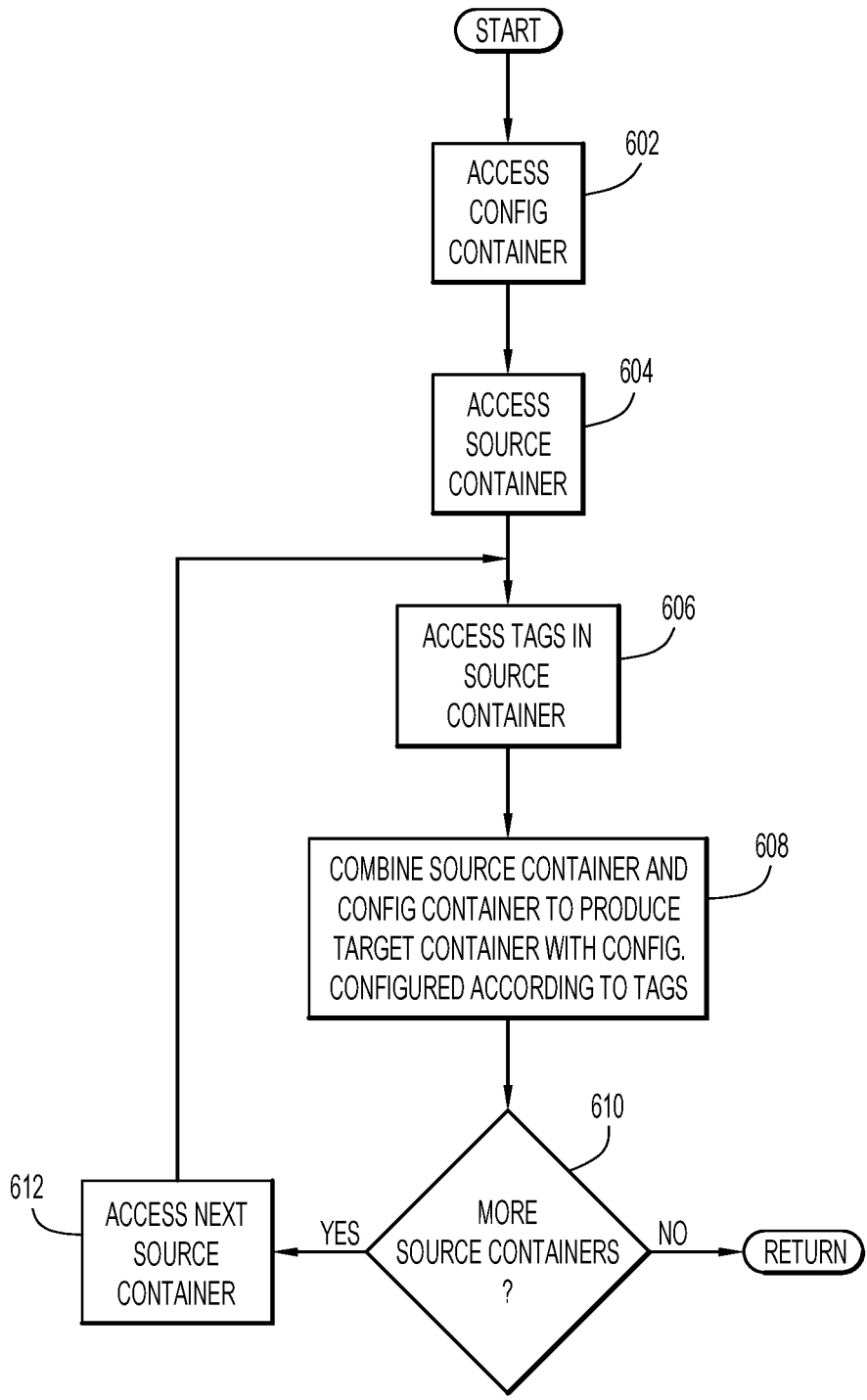
FIG. 6 is a flowchart that explains example processing according to some embodiments of the invention.

FIG. 6 is a flowchart illustrating an example process in which a base image of a configuration container is combined with each of a multiple number of respective base images of source containers to produce respective base images of target containers. The process may be executed on processing device 104 or server 108. In this embodiment, the base images of source containers may include tags as previously described.

The process may begin with accessing a base image of a configuration container (act 602) and accessing a base image of a source container (act 604). Next, any tags within the base image of the source container may be accessed (act 606). In this embodiment, each of the base images of the source containers includes respective tags that indicate a respective specific middleware configuration and whether the respective base image of the target container is to be configured for a production environment or a development environment.

The base image of the source container and the base image of the configuration container may then be combined to produce a base image of a target container, which includes applications and an operating system from the source container and a configuration from the base image of the configuration container configured as indicated by any tags included in the base image of the source container and middleware that may be included in the base image of configuration container (act 608).

Next, a check may be made to determine whether there are any additional base images of source containers to combine with the base image of the configuration container (act 610). If there are no additional base images of source containers to combine, then the process may be completed and the generated base images of the target containers may be executed by processing device 104 or server 108. Otherwise, a next base image of a source container may be accessed (act 612) and acts 606-610 may again be performed.

Figure 7:
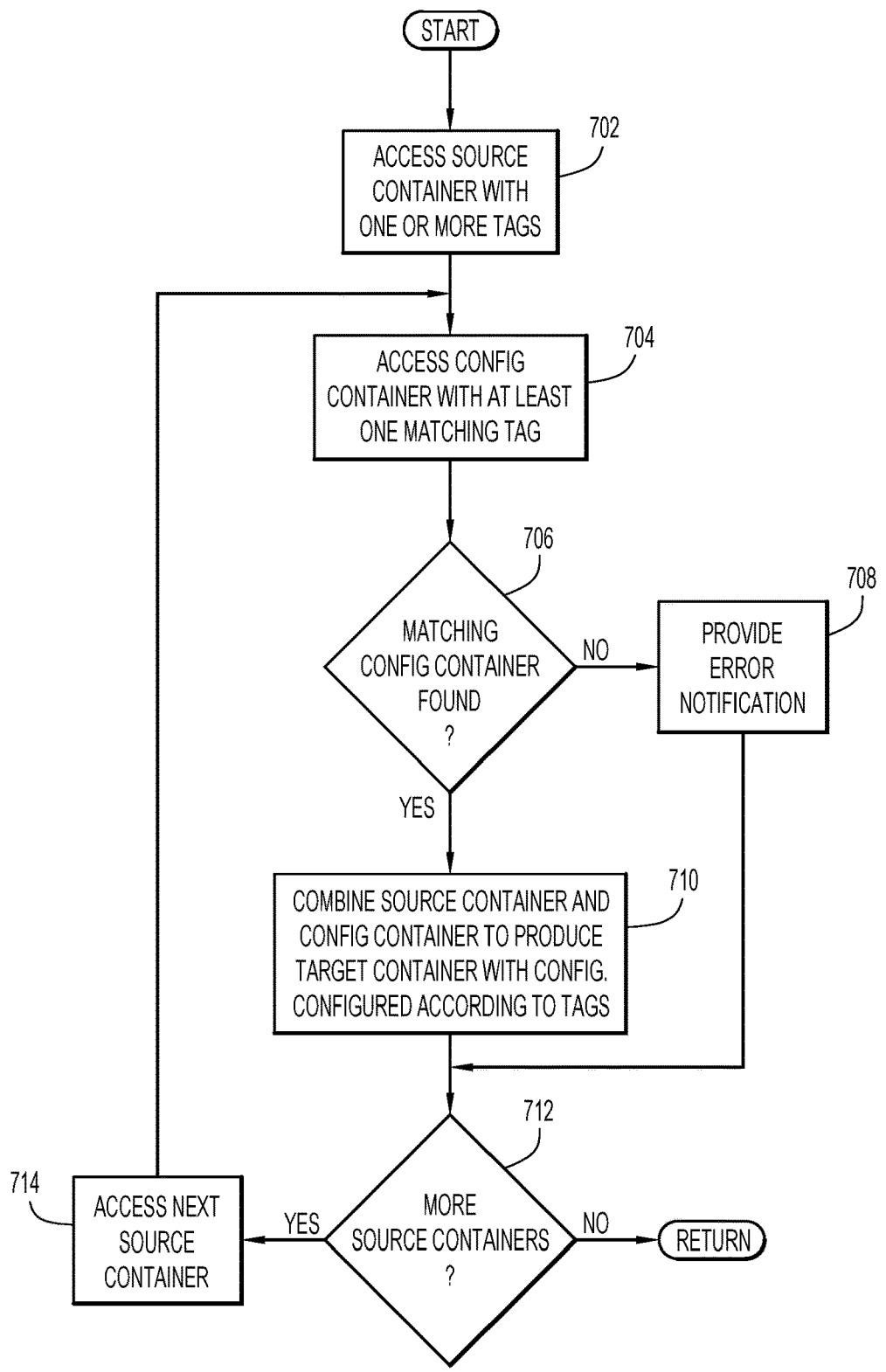
FIG. 7 is a flowchart that explains example processing according to other embodiments of the invention.

FIG. 7 is a flowchart of an example process that may be performed by processing device 104 or server 108. Respective base images of source containers may have one or more tags, as previously described. Each of the respective base images of the source containers may be accessed from a first repository and combined with a respective base image of a configuration container from the first repository or a second repository. Each of the respective base images of the configuration container may have a tag with a value that matches a value of at least one tag of the respective base image of the source container with which it will be combined to produce a respective base image of a target container having any applications, middleware and an operating system from the base image of the respective source container and a configuration from the base image of the respective configuration container configured according to tags included in the respective base image of the source container and the respective base image of the target container.

The process may begin by accessing a base image for a source container, having one or more tags, from a repository (act 702) and accessing a base image of a configuration container, from the repository or a second repository, with at least one tag with a value that matches at least one tag of the base image of the source container (act 704). If a base image of a configuration container having at least one tag with a value that matches at least one tag of the base image of the source container is not found, then an error notification may be provided (act 708) and a check may be made to determine whether there are any additional base images of source containers to process (act 712).

If, during act 706, a matching base image of a configuration container is found, then the base image of the source container and the base image of the configuration container may be combined to produce a base image of a target container including, from the base image of the source container, all applications and an operating system and, from the base image of the configuration container, the configuration including middleware, with changes to the configuration according to the tags from the base image of the source container and the base image of the configuration container (act 710).

Next, a check is made to determine whether there are any additional base images of source containers to combine (act 712). If not, then the process is completed and processing device 104 or server 108 may execute the base images of the target containers. Otherwise, a base image of a next source container may be accessed from the repository (act 714) and acts 704-712 may again be performed.

It will be appreciated that the embodiments described above and illustrated in the drawings represent only a few of the many ways of implementing embodiments for producing a base image of a target container from a base image of a source container and a base image of a configuration container.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for generating a container providing a computing environment comprising:
   combining, by at least one processing device, a base image of a first type of container including at least one application and an operating system, but not including middleware and configuration information, with a base image of a second type of container including the middleware and the configuration information, but not including any applications and any operating system, to produce a base image of a target container including, from the base image of the first type of container, the at least one application and the operating system, and the middleware and the configuration information from the base image of the second type of container; and
   executing the base image of the target container on a computer to provide the computing environment configured in accordance with the configuration information.

2. The computer-implemented method of claim 1, wherein the configuration information includes information for a specific environment.

3. The computer-implemented method of claim 2, further comprising:
   combining a base image of each of a plurality of first type of containers with a base image of a respective second type of container of a plurality of second type of containers, each of the base images of the plurality of the second type of containers including middleware and configuration information for a respective specific environment, but not including at least one corresponding application and a corresponding operating system, to produce a respective base image for each of a plurality of target containers, each of the respective base images of each of the plurality of the first type of containers including the at least one corresponding application and the corresponding operating system, but not including the middleware and the configuration information for the respective specific environment, and each of the base images of the plurality of target containers including the at least one corresponding application, the corresponding operating system and the middleware and the configuration information for the respective desired specific environment.

4. The computer-implemented method of claim 3, wherein each of at least two of the base images of the plurality of the first type of containers are combined with a base image of a same one of the plurality of the second type of containers to produce respective target containers.

5. The computer-implemented method of claim 1, wherein:
   the first type of container includes at least one tag, and
   the combining further configures the configuration information for a specific environment as indicated by the at least one tag such that the configuration information in the base image of the target container includes a configuration for the specific environment.

6. The computer-implemented method of claim 5, further comprising:
   combining each of a plurality of base images of first type of containers with the base image of the second type of container to produce base images of respective target containers.

7. The computer-implemented method of claim 6, wherein each of the base images of the respective target containers is configured for a respective specific environment as indicated by at least one tag in a respective base image of the respective first type of container.

8. A computer system for generating a container providing a computing environment, the computer system comprising:
   at least one processor; and
   at least one memory connected to the at least one processor, the at least one memory having instructions stored such that when the at least one processor executes the instructions, the at least one processor performs a method comprising:
      combining a base image of a first type of container including at least one application and an operating system, but not including middleware and configuration information, with a base image of a second type of container including the middleware and the configuration information, but not including any applications and any operating system, to produce a base image of a target container including, from the first type of container, the at least one application and the operating system, and the middleware and the configuration information from the base image of the second type of container; and executing the base image of the target container to provide the computing environment configured in accordance with the configuration information.

9. The computer system of claim 8, wherein the configuration information includes information for a specific environment.

10. The computer system of claim 9, wherein the method further comprises:

combining a base image of each of a plurality of first type of containers with a base image of a respective second type of container of a plurality of second type of containers, each of the base images of the plurality of the second type containers including middleware and configuration information for a respective specific environment, but not including at least one corresponding application and a corresponding operating system, to produce a respective base image for each of a plurality of target containers, each of the respective base images of each of the plurality of first type of containers including the at least one corresponding application and the corresponding operating system, but not including the middleware and the configuration information for the respective specific environment, and each of the base images of the plurality of target containers including the at least one corresponding application, the corresponding operating system and the middleware and the configuration information for the respective specific environment.

11. The computer system of claim 10, wherein each of at least two of the base images of the plurality of first type of containers are combined with a base image of a same one of the plurality of second type of containers to produce respective target containers.

12. The computer system of claim 8, wherein:

the first type of container includes at least one tag, and the combining further configures the configuration information for a specific environment as indicated by the at least one tag such that the configuration information in the base image of the target container includes a configuration for the specific environment.

13. The computer system of claim 12, further comprising:

combining each of a plurality base images of first type of containers with the base image of the second type of container to produce base images of respective target containers.

14. The computer system of claim 13, wherein each of the base images of the respective target containers is configured for a respective specific environment as indicated by at least one tag in a respective base image of the respective first type of container.

15. A computer program product comprising at least one computer readable storage medium having computer readable program code embodied therewith for execution on at least one processor of a computer device, the computer readable program code being configured to be executed by the at least one processor to perform:

combining a base image of a first type of container including at least one application and an operating system, but not including middleware and configuration information, with a base image of a second type of container including the middleware and the configuration information, but not including any applications and any operating system, to produce a base image of a target container including, from the first type of container, the at least one application and the operating system, and the middleware and the configuration information from the base image of the second type of container; and executing the base image of the target container to provide a computing environment configured in accordance with the configuration information.

16. The computer program product of claim 15, wherein the configuration information includes information for a specific environment.

17. The computer program product of claim 16, wherein the computer readable program code is further configured to be executed by the at least one processor to perform:

combining a base image of each of a plurality of first type of containers with a base image of a respective second type of container of a plurality of second type of containers, each of the base images of the plurality of the second type of containers including middleware and configuration information for a respective specific environment, but not including at least one corresponding application and a corresponding operating system, to produce a respective base image for each of a plurality of target containers, each of the respective base images of each of the plurality of first type of containers including the at least one corresponding application and the corresponding operating system, but not including the middleware and the configuration information for the respective specific environment, and each of the base images of the plurality of target containers including the at least one corresponding application, the corresponding operating system and the middleware and the configuration information for the respective specific environment.

18. The computer program product of claim 17, wherein each of at least two of the base images of the plurality of first type of containers are combined with a base image of a same one of the plurality of second type of containers to produce respective target containers.

19. The computer program product of claim 15, wherein:

the first type of container includes at least one tag, and the combining further configures the configuration information for a specific environment as indicated by the at least one tag such that the configuration information in the base image of the target container includes a configuration for the specific environment.

20. The computer program product of claim 19, wherein the computer readable program code is further configured to be executed by the at least one processor to perform:

combining each of a plurality base images of first type of containers with the base image of the second type of container to produce base images of respective target containers, wherein each of the base images of the respective target containers is configured for a respective specific environment as indicated by at least one tag in a respective base image of the respective first type of container.

* * * * *